US009525744B2

(12) United States Patent
 Zao

(10) Patent No.: US 9,525,744 B2
(45) Date of Patent: Dec. 20, 2016

(54) DETERMINING A UNIFORM USER IDENTIFIER FOR A VISITING USER

(71) Applicant: Alibaba Group Holding Limited, George Town (KY)

(72) Inventor: Xuebo Zao, Hangzhou (CN)

(73) Assignee: Alibaba Group Holding Limited (KY)

( * ) Notice: Subject to any disclaimer, the term of this patent is extended or adjusted under 35 U.S.C. 154(b) by 539 days.

(21) Appl. No.: 14/023,060

(22) Filed: Sep. 10, 2013

(65) Prior Publication Data

US 2014/0089499 A1 Mar. 27, 2014

(30) Foreign Application Priority Data

Sep. 21, 2012 (CN) .......................... 2012 1 0356956

(51) Int. Cl.
 *G06F 15/173* (2006.01)
 *H04L 29/08* (2006.01)
(52) U.S. Cl.
 CPC ............... *H04L 67/22* (2013.01); *H04L 67/02* (2013.01); *H04L 67/306* (2013.01)
(58) Field of Classification Search
 CPC ......... H04L 67/22; H04L 67/306; H04L 67/02
 USPC ....................................................... 709/224
 See application file for complete search history.

(56) References Cited

U.S. PATENT DOCUMENTS

| 6,141,778 | A | * | 10/2000 | Kane ..................... G06F 21/604 |
| | | | | 726/4 |
| 7,761,558 | B1 | | 7/2010 | Jindal et al. |
| 8,204,833 | B2 | | 6/2012 | Mu et al. |
| 8,352,319 | B2 | | 1/2013 | Wang et al. |
| 8,429,160 | B2 | | 4/2013 | Osann, Jr. |
| 8,490,168 | B1 | | 7/2013 | Holloway et al. |

FOREIGN PATENT DOCUMENTS

CN          102143091          8/2011

* cited by examiner

*Primary Examiner* — Viet Vu
*Assistant Examiner* — Herman Belcher
(74) *Attorney, Agent, or Firm* — Van Pelt, Yi & James LLP

(57) ABSTRACT

Determining a uniform user identifier for a visiting user is disclosed, including: generating a plurality of access sets based at least in part on the network address identifier associated with a plurality of access requests submitted by one or more visiting users, and a plurality of header field elements associated with the plurality of access requests, wherein each of the plurality of access requests includes a preliminary user identifier, the network address identifier, and the plurality of header field elements, and wherein an access set includes the network address identifier and at least some of the plurality of header field elements; determining information loss rates corresponding to respective ones of at least a subset of the plurality of access sets; and selecting an access set from the plurality of access sets based at least in part on the respective information loss rate to use to determine a uniform user identifier corresponding to a visiting user of the plurality of visiting users.

18 Claims, 5 Drawing Sheets

DETERMINING A UNIFORM USER IDENTIFIER FOR A VISITING USER

CROSS REFERENCE TO OTHER APPLICATIONS

This application claims priority to People's Republic of China Patent Application No. 201210356956.6 entitled A METHOD AND A DEVICE FOR EXCHANGING USER DATA, filed Sep. 21, 2012 which is incorporated herein by reference for all purposes.

FIELD OF THE INVENTION

The present application relates to the field of Internet technology. In particular, the present application relates to techniques for determining identifying information associated with users.

BACKGROUND OF THE INVENTION

As Internet technology develops, various Internet websites gain a broader understanding of user access information by exchanging the user data of visiting users among themselves. As a consequence, Internet websites can use collected user access information as a basis for providing users with products that better suit their needs.

In order for different Internet websites to be able to identify which collected user access information belongs to the same user, the various websites need to determine a unique identifier for each unique user and use the unique identifier as a basis for exchanging the user data of this particular user. In some conventional processes, when users visit various websites, requests may be sent to a central server to request unique identifiers for the users. The central server generates unique identifiers corresponding to the users based on user information included in the requests sent by the websites and sends these generated unique identifiers back to the various websites. The websites then write these unique identifiers into user client cookies. The websites then exchange user data on the basis of the unique identifiers.

In the processes described above, sometimes the central servers that generate unique identifiers corresponding to the users are operated by third parties, which could make the user information that is sent and/or received from the third party central servers vulnerable to security intrusions.

BRIEF DESCRIPTION OF THE DRAWINGS

Various embodiments of the invention are disclosed in the following detailed description and the accompanying drawings.

DETAILED DESCRIPTION

Figure 1:
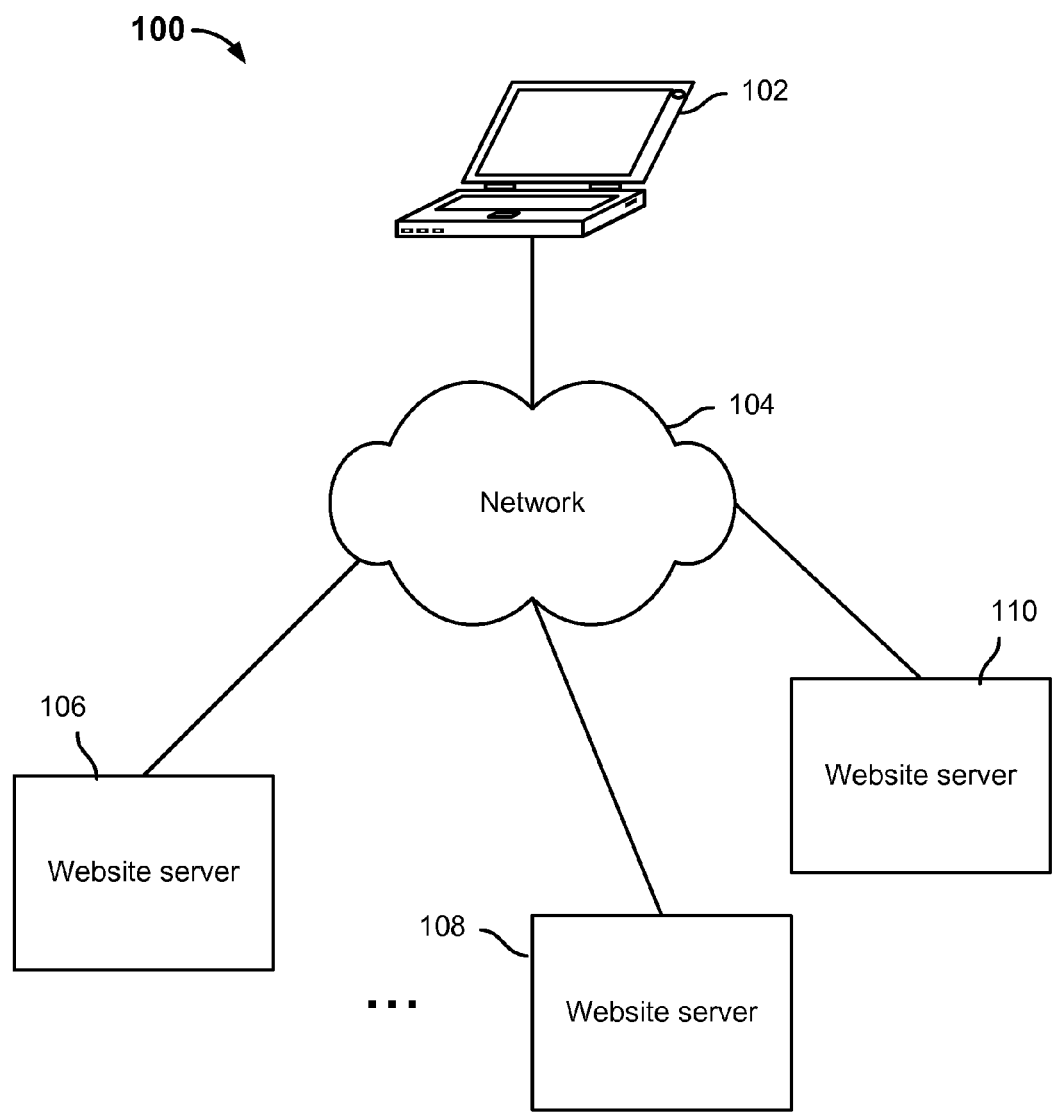
FIG. 1 is a diagram showing an embodiment of a system for determining a uniform user identifier for a user.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of determining a uniform user identifier for a visiting user are described herein. Access requests submitted by various visiting users are received. For example, the access requests may be received by a website from one or more visiting users. An access request includes a header field and the header field includes various elements and corresponding values. Access sets are generated based on different combinations of one or more header field elements and a network address identifier (e.g., an Internet Protocol address). A number of access requests (e.g., associated with a specified data flow range) associated with each access set is examined to determine the associated information loss rate. A particular access set (e.g., associated with the lowest information loss rate) is used to determine a uniform user identifier for each unique visiting user. In various embodiments, a "uniform user identifier" comprises a unique user identifier for a visiting user that can be used to identify that visiting user across one or more websites.

In some embodiments, different types of user data may be stored for the same user by different websites. For example, there may be keyword search data associated with a user stored at a search website, there may be access data for various channel pages associated with the user stored at a portal website, and there may be browsing, bookmarking, and transaction data associated with the user stored at an e-business website. Therefore, each website may separately store different data on the same user, but different websites may keep different identifying information on the same user. Therefore, it would be desirable to determine a uniform user identifier that uniquely identifies the same user across multiple websites. After a uniform user identifier is determined for each user, the uniform user identifier can be used by the various websites to identify and exchange the different data stored by different websites for the same user. The data aggregated across various websites creates a more complete profile of the user's preferences and/or historical activities. After such exchanging of data, the various websites can then optimize searches, personalize page pushing, optimize advertisement pushing, and/or otherwise customize interaction with a particular user based on the different data aggregated on the user from various websites.

FIG. 1 is a diagram showing an embodiment of a system for determining a uniform user identifier for a user. In the example, system 100 includes client device 102, network 104, and website servers 106, 108, and 110. Network 104 includes high-speed data networks and/or telecommunications networks. Client device 102 is configured to communicate to each of website servers 106, 108, and 110 over network 104. Website servers 106, 108, and 110 are configured to communicate to each other over network 104.

Each website server, such as website servers 106, 108, and 110, for example, is associated with hosting a different website. Examples of websites include an e-commerce website, a search engine, and/or a news website. Users may visit the websites associated with one or more of website servers 106, 108, and 110 using client devices such as client device 102. While client device 102 is shown to be a laptop computer, other examples of client device 102 include a desktop computer, a smart phone, a mobile device, a tablet device and any other type of computing device. For example, a user may open a web browser application executing at a client device and direct the browser application to a web address associated with such a website. A user's interaction with each website may cause the user's client device to send one or more access requests for the desired data to the appropriate website server. One or more users may use the same client device or different client devices to send access requests to the website server(s). Each of website servers 106, 108, and 110 is configured to store user data (e.g., associated with the user's historical activities at the website) associated with the visiting users within a database, for example, corresponding to that website server. However, each of website servers 106, 108, and 110 may assign a different identifier (for example, a preliminary user identifier) to the same user (e.g., based on a naming scheme that is configured for that website). Due to the difference in the manners that website servers 106, 108, and 110 assign identifiers to users, it is difficult for website servers 106, 108, and 110 to exchange the user data that it has stored with other website servers. This is because the different naming schemes make it difficult to determine which user data stored by a first website server corresponds to the same user whose user data is stored by another website server. Conventionally, each of website servers 106, 108, and 110 might send at least some user data to a third party server that is associated with generating a unique identifier for a user. However, sending and receiving information with the third party server may not be secure.

As will be described in further detail below, using received access requests, one or more website servers, such as website servers 106, 108, and 110, is enabled to determine a uniform user identifier for each visiting user that is recognized by multiple website servers without the use of a third party unique identifier generating server. As such, a determined uniform user identifier may be recognized by multiple website servers to uniquely represent one visiting user. Therefore, each of multiple website servers may store user data associated with a user's uniform user identifier and exchange stored data with each other based on the user's uniform user identifier. As a result of such user data exchange, each such website may provide a better, more customized/optimized user experience for a visiting user based on data collected by other websites.

Figure 2:
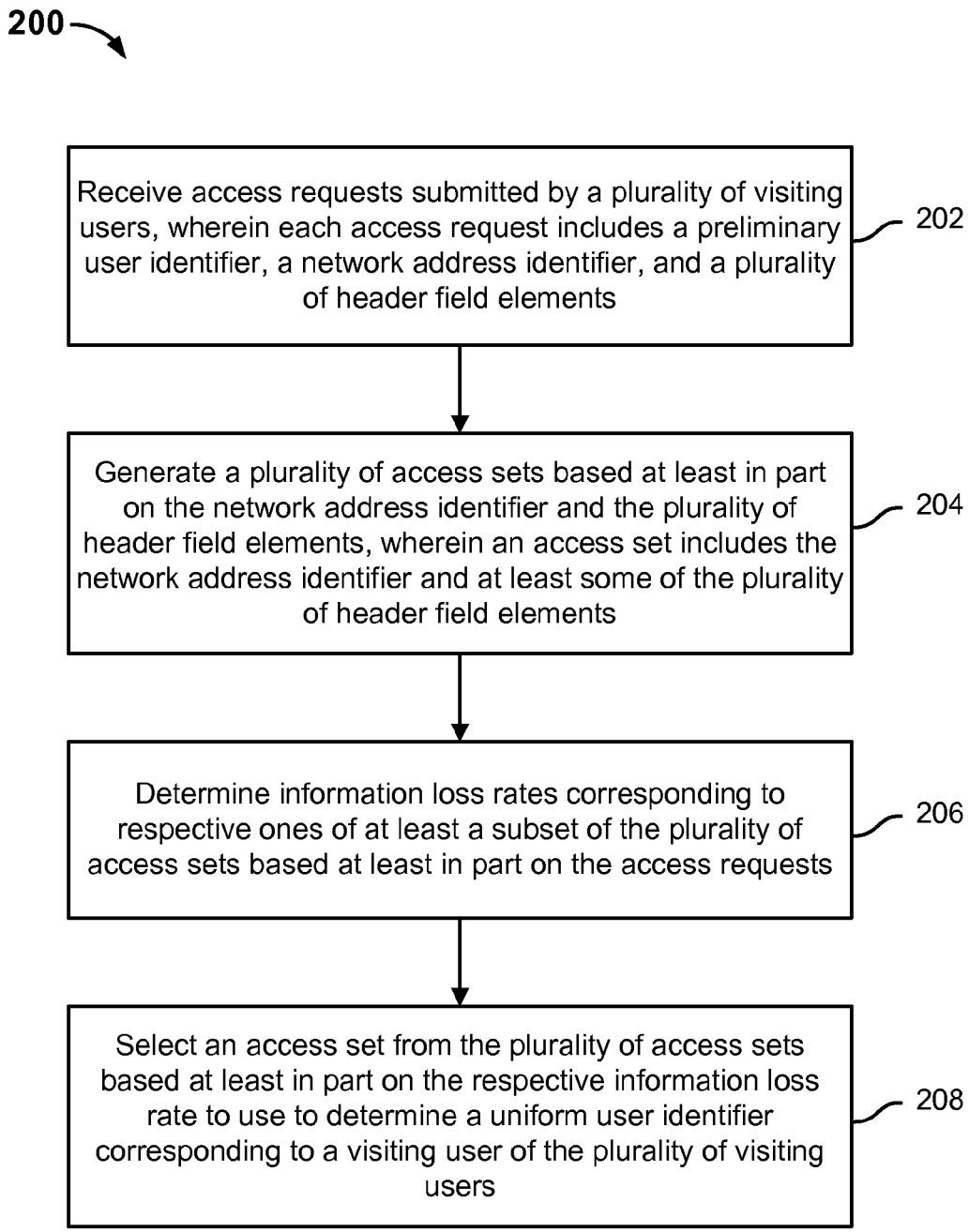
FIG. 2 is a flow diagram showing an embodiment of a process for determining a uniform user identifier for a user.

FIG. 2 is a flow diagram showing an embodiment of a process for determining a uniform user identifier for a user. In some embodiments, process 200 may be implemented at one or more website servers 106, 108, and 110 of system 100.

Process 200 is used to determine a uniform user identifier for each of at least a subset of visiting users that have submitted access requests. In various embodiments, a uniform user identifier associated with a user comprises a combination of a network address identifier and the respective value(s) corresponding to at least one access request header field elements. In some embodiments, process 200 is implemented for one or more websites that exchange stored user data with each other. For example, stored user data may include data associated with historical user activities and user preferences. For example, process 200 is implemented by each website such that each website would determine the same uniform user identifier for the same visiting user. For example, a website may store data and associate it with a particular user if the data matches the uniform user identifier associated with the user.

At 202, access requests submitted by a plurality of visiting users are received, wherein each access request includes a preliminary user identifier, a network address identifier, and a plurality of header field elements, as will be described below. An example of an access request is a Hypertext Transfer Protocol (HTTP) request that is sent from a client device associated with one or more users. In various embodiments, an access request includes a preliminary user identifier of the visiting user associated with the access request, a network address identifier, and various values corresponding to the various elements of the header field of the access request. The preliminary user identifier of the user can be the user cookie identifier. Note that the preliminary user identifier is not necessarily the same as the uniform user identifier of a user because the uniform user identifier may identify the same user across different websites, while the same user may be associated with a different preliminary user identifier (e.g., cookie identifier) at each website. In some embodiments, the network address identifier can be the Internet Protocol (IP) address corresponding to the visiting user.

For example, if the access request is an HTTP access request, the header field of the access request may include at least one of the following elements: Accept-Language (user-accepted language) information, Accept-Encoding (user-accepted encoding) information, User-Agent (user client) information, and one or more types of user client information. Example types of user client information include: UA-Pixels (user client pixels) information, UA-Color (user client color) information, UA-OS (user client operating system) information, and UA-CPU (user client central processing unit) information. However, an access request may be associated with a protocol different than HTTP.

At 204, a plurality of access sets is generated based at least in part on the network address identifier and the plurality of header field elements, wherein an access request includes the network address identifier and at least some of the plurality of header field elements. An access set comprises a network address identifier and at least one header field element. Multiple access sets may be generated based on a network address identifier and one or more different combinations of one or more header field elements. In some embodiments, at least a subset of all possible header field elements is selected from which to form such combinations to include in various access sets.

For example, A, B, C and D are used to respectively represent the four selected header field elements of Accept-Language, Accept-Encoding, User-Agent, and user client information of an access request. To simplify this example, assume that all the access requests are received from visiting users with the same network address, which is associated with a network address identifier represented by IP1. Given that an access set must include a network address identifier and at least one selected header field element, in this example where the only network address identifier is represented by IP1 and the four selected elements from the header field include A, B, C, and D, it is possible to generate 15 ($=C_4^1+C_4^2+C_4^3+C_4^4$) different access sets based on combinations of at least a subset of the four selected elements from the header field. The determined access sets include: [A, IP1], [B, IP1], [C, IP1], [D, IP1], [A, B, IP1], [A, C, IP1], [A, D, IP1], [B, C, IP1], [B, D, IP1], [C, D, IP1], [A, B, C, IP1], [A, B, D, IP1], [A, C, D, IP1], [B, C, D, IP1], [A, B, C, D, IP1].

At 206, information loss rates corresponding to respective ones of at least a subset of the plurality of access sets are determined based at least in part on the access requests. In some embodiments, a data flow range is specified (e.g., by a system administrator prior to the start of process 200). In various embodiments, the specified data flow range comprises a number of access requests that is received over a specified interval of time to use to determine the information loss rate corresponding to the access set. For example, the specified data flow range can be configured as the number of access requests that are received within an interval of one day. Data flows received at an e-commerce website may include one or more of the following example types: data flows associated with interactions between the logon page and users, data flows associated with interactions between product browsing pages and users, and data flows associated with product transaction pages and users. In some embodiments, a different data flow range may be specified for each different type of data flow.

In various embodiments, the information loss rate determined for an access set using the specified data flow range may represent the predicted accuracy or confidence level of using this access set to determine a uniform user identifier for each of various visiting users. That is, the lower the information loss rate that is determined for this access set, the greater the predicted accuracy of using this access set to determine uniform user identifiers to uniquely represent various visiting users. Conversely, the higher the information loss rate that is determined for this access set, the lower the predicted accuracy of using this access set to determine uniform user identifiers to uniquely represent various visiting users. As will be described in further detail below, the information loss rate represents the predicted loss of accuracy associated with using the corresponding access set to determine uniform user identifiers for the visiting users.

An example process of computing the information loss rate of an access set is described with FIG. 3 below.

Returning to FIG. 2, at 208, an access set from the plurality of access sets is selected based at least in part on the respective information loss rate to use to determine a uniform user identifier corresponding to a visiting user of the plurality of visiting users. In various embodiments, an access set is selected to use to determine uniform user identifiers corresponding to various visiting users. In various embodiments, the access set associated with the lowest loss information rate (and therefore the highest predicted accuracy that the access set will yield uniform user identifiers that uniquely represent various visiting users) is selected. For an access set, one or more access subsets may be determined based on the access set. An access subset includes the network address identifier of the access set and a combination of value(s) corresponding to the header field elements of the access set. The selected access set is used to determine one or more access subsets, where each access subset is determined as a uniform user identifier that represents a unique visiting user.

For example, the uniform user identifier may be used by different websites to identify a unique visiting user. For example, each website may associate the uniform user identifier with stored user data (e.g., received access requests and/or other stored user information) associated with that visiting user. This way, various different websites may attribute stored user data to the same user based on the user's uniform user identifier and use the uniform user identifier as a basis for correctly exchanging stored user data for the same user.

Figure 3:
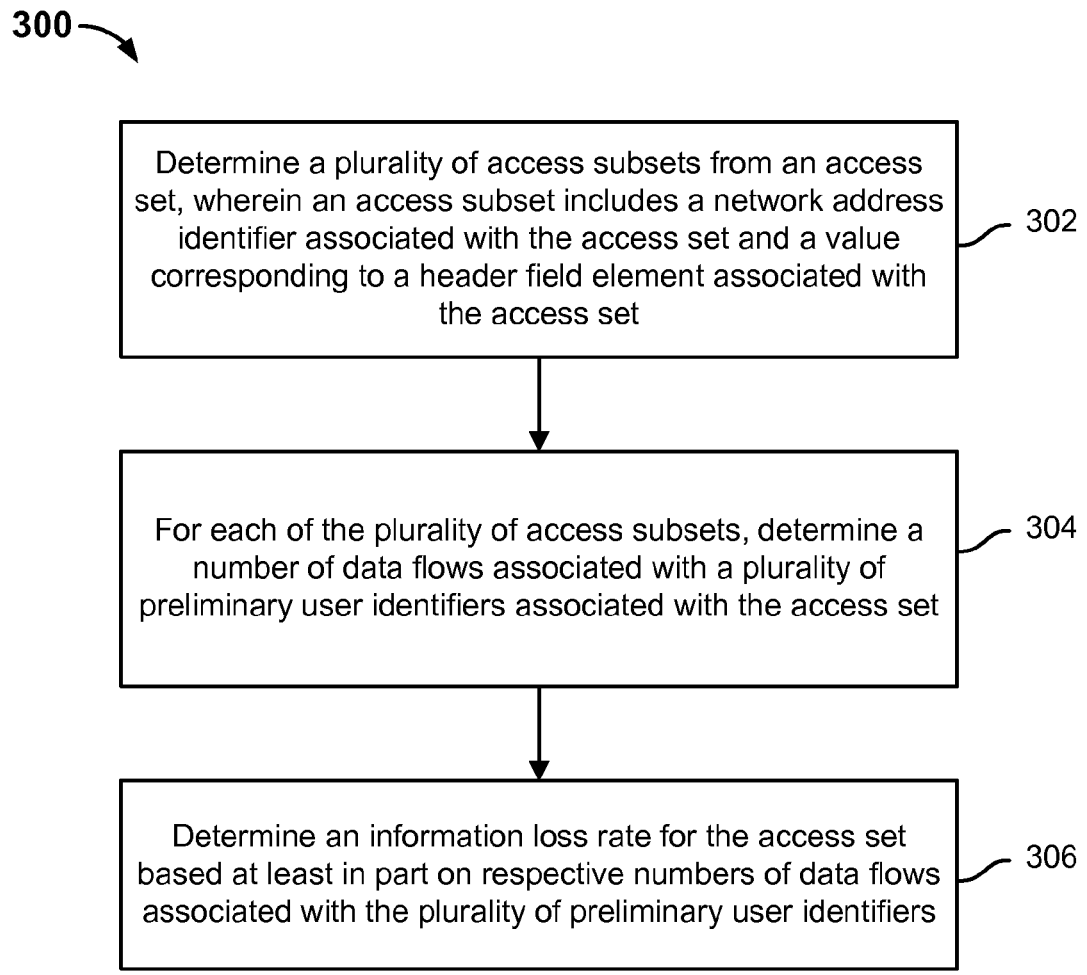
FIG. 3 is a flow diagram showing an example of determining the information loss rate for an access set.

FIG. 3 is a flow diagram showing an example of determining the information loss rate for an access set. In some embodiments, process 300 is implemented at one or more of website servers 106, 108, and 110 of FIG. 1. In some embodiments, 206 of process 200 is implemented at least in part using process 300.

Process 300 is an example process of determining the information loss rate for one access set. As will be described below, an access set that is associated with access subset(s) that have the greatest one-to-one correspondence with preliminary user identifiers associated with the access set is selected to use to determine uniform user identifiers. The closer that access subset(s) associated with the access set come to a one-to-one correspondence with preliminary user identifiers associated with the access set, the lower the information loss rate that is determined for the access set. Therefore, in some embodiments, the access set with the lowest information loss rate is selected to use to determine uniform user identifiers.

At 302, a plurality of access subsets are determined from an access set, wherein an access subset includes a network address identifier associated with the access set and a value corresponding to a header field element associated with the access set. One or more access subsets are determined from an access set. For example, the access set may be generated from at least a subset of available header field elements. The contents of an access subset are the network address identifier of the access set and the value(s) corresponding to the header field element(s) of the access set.

For example, the header field elements of an access set include Accept-Language information and Accept-Coding information. Also, let us assume that the received access requests are associated with three different preliminary users (i.e., three different user identifiers assigned by different websites) and all the access requests are associated with the same network address identifier. The preliminary user identifiers corresponding to these three users are represented as B1, B2 and B3. Assume that these three users associated with the three preliminary user identifiers all have the same network address identifier that is represented by IP1. Assume that the specified data flow range is 50 (i.e., 50 is the number of access requests that were received within the specified interval of time associated with the data flow range). Therefore, 50 data flows associated with the access set including the header field elements of Accept-Language information and Accept-Coding information and the network address identifier of IP1 are examined to determine the information loss rate. The access set may also be represented as [Accept-Language information, Accept-Coding information, IP1].

In the example, among the 50 access requests associated with the access set that are submitted by the users associated with the three different preliminary user identifiers, there is only one value of "Chinese" for the Accept-Language information element and two different values of "Encoding 1" and "Encoding 2" for the Accept-Coding information element. Therefore, the access set [Accept-Language information, Accept-Coding information, IP1] for these three users who have the same network address identifier IP1 may be processed into the following two access subsets: [Chinese, Encoding 1, IP1] and [Chinese, Encoding 2, IP1]. Note that given the one value ("Chinese") for the Accept-Language information element that appeared in the access requests and the two different values ("Encoding 1" and "Encoding 2") for the Accept-Coding information element that appeared in the access requests, there are only two possible combinations (and therefore, only two possible access subsets) of the values corresponding to respective ones of the header field elements in addition to the network address identifier ("IP1") associated with the access set.

For simplicity, A1 is used to represent the value of "Chinese" for the Accept-Language information element, and C1 and C2 are used to respectively represent the values of "Encoding 1" and "Encoding 2" for the Accept-Coding information element.

As such, the access subsets associated with the access set of [Accept-Language information, Accept-Coding information, IP1] may be represented as: [A1, C1, IP1] and [A1, C2, IP1].

At 304, for each of the plurality of access subsets, a number of data flows associated with a plurality of preliminary user identifiers associated with the access set is determined.

Since the elements of the header field included in each of the access requests are based on standard protocols, the contents of the header field included in access requests submitted by different visiting users may sometimes include some of the same header field elements. In addition, the header field information included in different access requests submitted by the same visiting user may sometimes include at least some different header field elements. Put another way, more than one unique visiting user may correspond to the same access subset or rather, one access subset may correspond to multiple unique visiting users.

Continuing the same example from above, let us assume:

Among the access requests submitted by the visiting user corresponding to preliminary user identifier B1, there are access requests that were submitted with the value of "Chinese" for the Accept-Language information element, the value of "Encoding 1" for the Accept-Coding information element, and IP1 as the network address identifier, as well as access requests that were submitted with the value of "Chinese" for the Accept-Language information element, the value of "Encoding 2" for the Accept-Coding information element, and IP1 as the network address identifier.

Among the access requests submitted by the visiting user corresponding to preliminary user identifier B2, there are access requests that were submitted with the value of "Chinese" for the Accept-Language information element, the value of "Encoding 1" for the Accept-Coding information element, and IP1 as the network address identifier, as well as access requests that were submitted with the value of "Chinese" for the Accept-Language information element, the value of "Encoding 2" for the Accept-Coding information element, and IP1 as the network address identifier.

Among the access requests submitted by the visiting user corresponding to preliminary user identifier B3, there are access requests that were submitted with only the value of "Chinese" for the Accept-Language information element, the value of "Encoding 1" for the Accept-Coding information element, and IP1 as the network address identifier.

Figure 4:
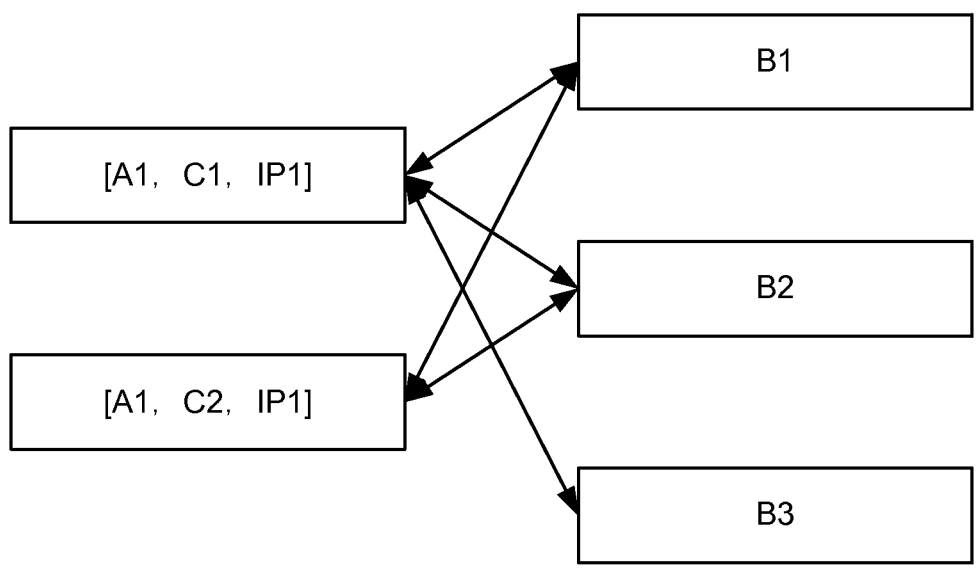
FIG. 4 shows a diagram of correspondences between preliminary user identifiers B1, B2, and B3 and access subsets [A1, C1, IP1] and [A1, C2, IP1] of an example.

FIG. 4 shows a diagram of correspondences between preliminary user identifiers B1, B2, and B3 and access subsets [A1, C1, IP1] and [A1, C2, IP1] of the example. As shown in FIG. 3, the access subset [A1, C1, IP1] corresponds to the preliminary user identifiers B1, B2, and B3 and the access subset [A1, C2, IP1] corresponds to the preliminary user identifiers B1 and B2 but not B3.

Therefore, within the specified data flow range of 50 data flows that are associated with the access set, a number of [A1, C1, IP1] data flows that correspond to each of preliminary user identifiers of B1, B2 and B3 is determined, and a number of [A1, C2, IP1] data flows that correspond to each of preliminary user identifiers of B1 and B2 is determined.

Specifically, an example technique of determining a number of an access subset's data flows for all of the preliminary user identifiers is as follows: within the specified data flow range associated with the access set, count the number of data flows that correspond to each access subset, the number of preliminary user identifiers corresponding to each access subset, and the number of access subsets corresponding to each preliminary user identifier; determine, for each preliminary user identifier corresponding to the access subset, the data flow of the access subset that is associated with the preliminary user identifier; use the sum of the access subset's data flows that are associated with each preliminary user identifier to determine the total number of access subset's data flows that correspond to all the preliminary user identifiers.

In the above technique, the formula $$\frac{N}{i \times j}$$

can be used to determine a number of a particular access subset's data flows associated with one preliminary user identifier, where N is the number of data flows associated with that particular access subset, i is the total number of preliminary user identifiers corresponding to that access subset, and j is the number of access subsets corresponding to that particular preliminary user identifier.

Continuing the above example, let us assume that of the specified 50 data flows, there are 30 data flows associated with the access subset of [A1, C1, IP1] and there are 20 flows associated with the access subset of [A1, C2, IP1].

Therefore, to determine the number of data flows of access subset [A1, C1, IP1] associated with preliminary user identifier B1

$$\left(\frac{N}{i \times j}\right); N = 30,$$

where N represents the number of access requests of the specified data flow range that are associated with access subset [A1, C1, IP1]; i=3, where i represents the total number of preliminary users identifiers (B1, B2 and B3) corresponding to access subset [A1, C1, IP1]; j=2, where j represents the number of access subsets ([A1, C1, IP1] and [A1, C2, IP1]) corresponding to preliminary user identifier B1. Therefore, the number of [A1, C1, IP1] data flows associated with preliminary user identifier B1 is $$\frac{N}{i \times j} = \frac{30}{2 \times 3} = 5.$$

Similarly, the number of data flows of access subset [A1, C1, IP1] associated with preliminary user identifier B2 is $$\frac{N}{i \times j} = \frac{30}{2 \times 3} = 5,$$

and the number of data flows of access subset [A1, C1, IP1] data flows associated with preliminary user identifier B3 is $$\frac{N}{i \times j} = \frac{30}{1 \times 3} = 10.$$

Therefore, the number of data flows of the access subset [A1, C1, IP1] associated with all the preliminary user identifiers associated with the access set is (5+5+10)=20.

Likewise, the number of data flows of the access subset [A1, C2, IP1] associated with preliminary user identifier B1 is $$\frac{N}{i \times j} = \frac{20}{2 \times 2} = 5,$$

and the number or data flows of the access subset [A1, C2, IP1] associated with preliminary user identifier B2 is $$\frac{N}{i \times j} = \frac{20}{2 \times 2} = 5.$$

Therefore, the number of data flows of the access subset [A1, C2, IP1] associated with all the preliminary user identifiers associated with the access set is (5+5)=10.

Returning to process 300 of FIG. 3, at 306, an information loss rate is determined for the access set based at least in part on respective numbers of data flows associated with the plurality of preliminary user identifiers.

The formula $$1 - \frac{R}{W}$$

can be used to determine the information loss rate corresponding to the access set, where R represents the sum associated with each access subset's data flows that are associated with all the preliminary user identifiers that are associated with the access set; W represents the specified data flow range.

Continuing the above example, the access subset [A1, C1, IP1] has a determined corresponding 20 data flows associated with all of the preliminary user identifiers (B1, B2, and B3), and the access subset [A1, C2, IP1] has a determined corresponding 10 data flows associated with all of the preliminary user identifiers (B1 and B2). Therefore, R=20+10=30 and W=50. Thus, the corresponding information loss rate of the access set of [Accept-Language information, Accept-Coding information, IP1] among the 50 data flows of the specified data flow range is $$1 - \frac{R}{W} = 1 - \frac{30}{50} = 0.4.$$

As mentioned above, in various embodiments, determining a uniform user identifier for each visiting user using the selected access set (e.g., the access set with the lowest information loss rate) includes determining that each different access subset determined from the selected access set is a uniform user identifier for a different visiting user.

Continuing the above example, if the information loss rate of the access set [Accept-Language information, Accept-Coding information, IP1] is the lowest of all other possible access sets, then the access subset [A1, C1, IP1] determined from the access set [Accept-Language information, Accept-Coding information, IP1] is determined as a first uniform user identifier for a first visiting user and access subset [A1, C2, IP1] is determined from the access set [Accept-Language information, Accept-Coding information, IP1] is determined as a second uniform user identifier for a second visiting user.

Note that in the example above, there are three preliminary user identifiers (B1, B2, and B3), which correspond to three visiting users. But ultimately, only two uniform user identifiers (the access subsets of [A1, C1, IP1] and [A1, C2, IP1]) are determined. Therefore, only two visiting users may be identified with these two uniform user identifiers. When an access subset determined from an access set is used to identify visiting users, the accuracy of such identification may be limited. The extent of the limitation on accuracy of identification of visiting users by the access subsets associated with a certain access set is represented by the information loss rate that is determined for that access set. As such, in some embodiments, the access set associated with the lowest information loss rate (and therefore, is predicted to be associated with access subsets that have the highest accuracy in uniquely representing all the visiting users associated with the access requests) is selected to use to determine uniform user identifiers corresponding to visiting users.

An optimal case of determining uniform user identifiers would be to determine an access set for which each associated access subset would correspond to only one preliminary user identifier. Therefore, in the optimal case, each the access subset determined from an access set would have a one-to-one correspondence with a preliminary user identifier associated with the access set. In this optimal case, the accuracy of using the access subsets associated with this access set to identify different visiting users is 100%. However, in actual practice, such an optimal access set is almost impossible to find. That is, in the likely event that an access subset associated with one access set is not in a one-to-one correspondence with each preliminary user identifier, the accuracy of using the access set to determine uniform user identifiers will be less than 100%. There are two kinds of situations that lead to this decreased accuracy or information loss rate:

In the first situation, different visiting users are associated with the same access subset within data flows. As a result, this access subset fails to distinguish among the different visiting users. For example, in the example above, there are three visiting users with the preliminary user identifiers B1, B2 and B3. All three of these visiting users employ the access subset [A1, C1, IP1] to carry data flows. However, the access subset [A1, C1, IP1] can only be used as one uniform user identifier, which is used to identify only one visiting user. Subsequently, the three visiting users that are associated with data flows associated with the access subset [A1, C1, IP1] cannot be differentiated by using [A1, C1, IP1] as a uniform user identifier.

In the second situation, the data flows of the same visiting user may be associated with different access subsets. As a result, if the various access subsets were used as uniform user identifiers, the data flows of this same visiting user will be identified as data flows associated with different users. Returning to the example above, B1 is a preliminary user identifier. This visiting user uses both access subsets [A1, C1, IP1] and [A1, C2, IP1] to carry data flows. However, if access subsets [A1, C1, IP1] and [A1, C2, IP1] are each used as a uniform user identifier, then each of [A1, C1, IP1] and [A1, C2, IP1] would be used to identify a different visiting user.

Therefore, the information loss rate determined above for an access set within a specified data flow range is the decrease in accuracy caused by one or both of the first and second situations described above when an access subset associated with the access set is used to identify each visiting user.

The determination of the information loss rate of an access set in the above example may also be understood in the following way:

As shown in FIG. 4, with regard to access subset [A1, C1, IP1], because all three of the visiting users (that correspond to the preliminary user identifiers of B1, B2, and B3) use access subset [A1, C1, IP1] to carry data flows, its accuracy rate will (due to the first situation described above) only be $\frac{1}{3}$, regardless of which visiting user is identified with [A1, C1, IP1]. Furthermore, when access subset [A1, C1, IP1] is used to identify the visiting user corresponding to preliminary user identifier B1 on the basis of the first situation, the data flow of the visiting user corresponding to preliminary user identifier B1 that is carried using [A1, C2, IP1] will, according to the second situation, also be identified as a data flow carried by another user, the visiting user corresponding to preliminary user identifier B2. Therefore, the accuracy of using [A1, C1, IP1] to identify the visiting user corresponding to preliminary user identifier B1 is $\frac{1}{3} \times \frac{1}{2}$. Likewise, the accuracy of using [A1, C1, IP1] to identify the visiting user corresponding to preliminary user identifier B2 is $\frac{1}{3} \times \frac{1}{3}$, and the accuracy of using [A1, C1, IP1] to identify the visiting user corresponding to preliminary user identifier B3 is $\frac{1}{3} \times 1$. Therefore, the accuracy of using the access subset [A1, C1, IP1] to identify one visiting user is $\frac{1}{3} \times \frac{1}{2} + \frac{1}{3} \times \frac{1}{2} + \frac{1}{3} \times 1 = \frac{2}{3}$.

Similarly, with regard to the access subset [A1, C2, IP1], two visiting users (that correspond to the preliminary user identifiers of B1 and B2) use access subset [A1, C2, IP1] to carry data flows. Therefore, according to the first situation, the accuracy rate of identifying which visiting user is associated with the access subset [A1, C2, IP1] will only be $\frac{1}{2}$, regardless of which of the two visiting users is identified using [A1, C2, IP1]. Furthermore, when [A1, C2, IP1] is used to identify the visiting user corresponding to preliminary user identifier B1 on the basis of the first situation, the data flow of the visiting user corresponding to preliminary user identifier B1 that is carried using [A1, C1, IP1] will, according to the second situation, also be identified as a data flow carried by the other user, the visiting user corresponding to preliminary user identifier B2. Therefore, the accuracy rate of using [A1, C2, IP1] to identify the visiting user corresponding to preliminary user identifier B1 is $\frac{1}{2} \times \frac{1}{2}$. Likewise, the accuracy of using [A1, C2, IP1] to identify the visiting user corresponding to preliminary user identifier B2 is $\frac{1}{2} \times \frac{1}{2}$. Therefore, the accuracy of using the access subset [A1, C2, IP1] to identify one access user is $\frac{1}{2} \times \frac{1}{2} + \frac{1}{2} \times \frac{1}{2} = \frac{1}{2}$.

Let us now consider the proportion, $\frac{30}{50}$, of the data flow associated with [A1, C1, IP1] relative to the total data flow (the specified data flow range) and the proportion, $\frac{20}{50}$, of the data flow included by [A1, C2, IP1] relative to the total data flow. Among these 50 data flows, the accuracy of using the two access subsets associated with the access set [Accept-Language information, Accept-Coding information, IP1] to separately identify different visiting users is: $\frac{30}{50}(\frac{1}{3} \times \frac{1}{2} + \frac{1}{3} \times \frac{1}{2} + \frac{1}{3} \times 1) + \frac{20}{50}(\frac{1}{2} \times \frac{1}{2} + \frac{1}{2} \times \frac{1}{2}) = 0.6$. Therefore, its information loss rate of the access set is determined as $1 - 0.6 = 0.4$.

As shown above, in some embodiments, an access set that is associated with access subset(s) that have the greatest one-to-one correspondence with each preliminary user identifier associated with the access set, and therefore the lowest information loss rate, is used to determine uniform user identifiers.

In some embodiments, an information loss rate threshold value may be configured (e.g., by a system administrator). The information loss rate threshold value may be used as follows: when the information loss rate corresponding to the access set with the lowest information loss rate fails to exceed the preset threshold value, the access subsets associated with that access set with the lowest information loss rate are used as uniform user identifiers to uniquely identify visiting users. However, when the information loss rate corresponding to the access set with the lowest information loss rate does not exceed the preset threshold value, that means that the accuracy of using the access subsets associated with the access set with the lowest information loss rate to identify visiting users is too low and therefore, the access subsets associated with that access set with the lowest information loss rate are not used as uniform user identifiers to uniquely identify visiting users.

Figure 5:
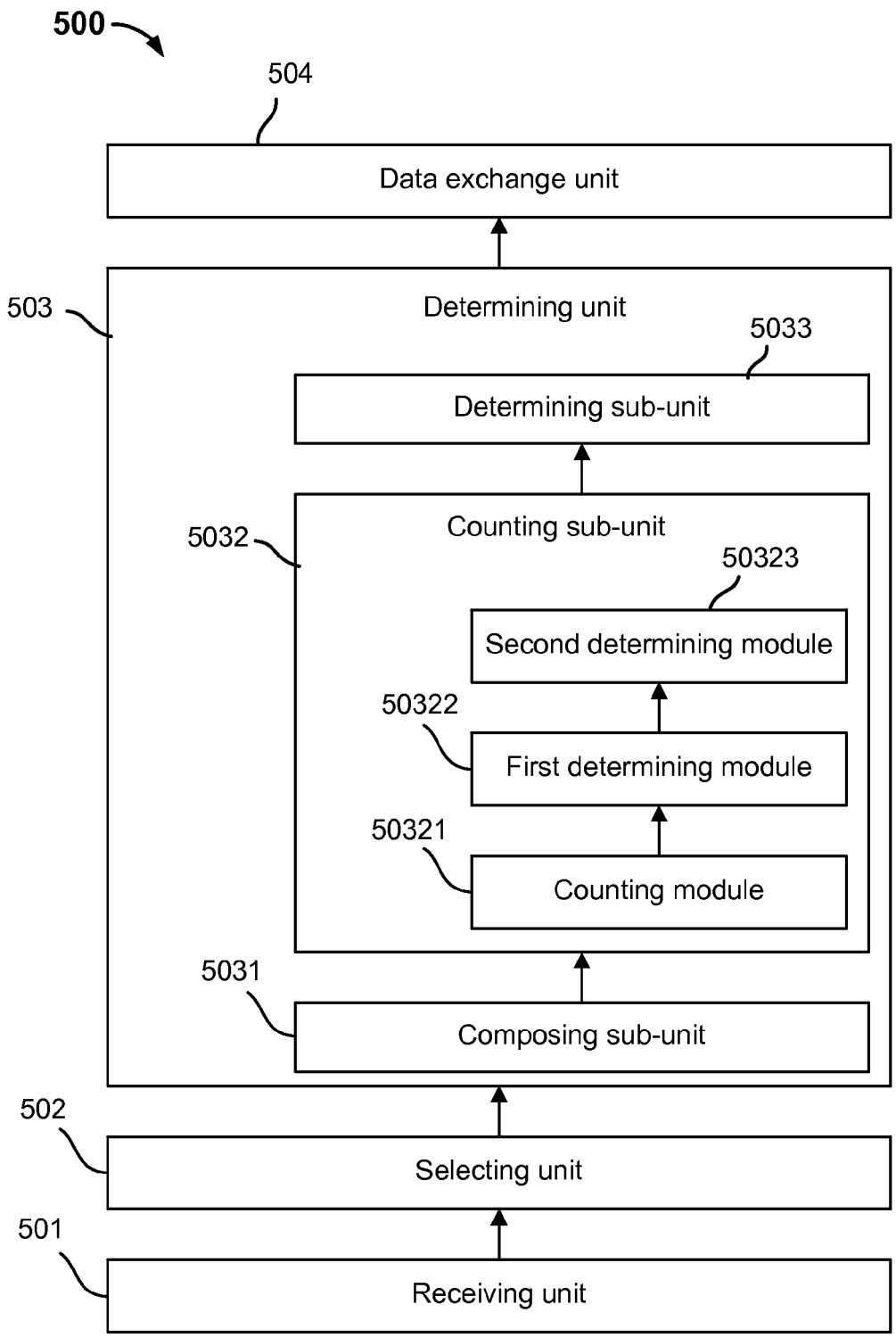
FIG. 5 is a diagram showing an embodiment of a system for determining a uniform user identifier for a visiting user.

FIG. 5 is a diagram showing an embodiment of a system for determining a uniform user identifier for a visiting user. In the example, system 500 includes receiving unit 501, selecting unit 502, determining unit 503, and data exchange unit 504. Determining unit 503 includes composing sub-unit 5031, counting sub-unit 5032, and determining sub-unit 5033. Counting sub-unit 5032 includes counting module 50321, first determining module 50322, and second determining module 50323.

The units, sub-units, and modules, can be implemented as software components executing on one or more processors, as hardware such as programmable logic devices and/or Application Specific Integrated Circuits designed to elements can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The units, sub-units, and modules may be implemented on a single device or distributed across multiple devices.

Receiving unit 501 is configured to receive access requests submitted by various visiting users. An access request is associated with a preliminary user identifier of the visiting user, a network address identifier, and at least one header field element.

Selecting unit 502 is configured to select at least one header field element from the header field elements included in each access request and a network address identifier corresponding to the visiting users to generate multiple access sets.

Determining unit 503 is configured to determine, using a specified data flow range, the information loss rate corresponding to each access set.

Data exchange unit 504 is configured to select an access set (e.g., the access set with the lowest information loss rate) to use to determine a uniform user identifier to represent each unique visiting user. The uniform user identifier for each visiting user is used as a basis for different websites to identify stored user data that corresponds to the same visiting user.

In some embodiments, determining unit 503 includes:

Composing sub-unit 5031, which is configured to determine one or more access subsets from each access set. An access subset includes the network address identifier from the access set and value(s) corresponding to respective ones of the header field elements that were associated with the access set.

Counting sub-unit 5032, which is configured to determine, using specified data flow range, each access subset's data flows associated with all the preliminary user identifiers that are associated with the access set.

Determining sub-unit 5033, which is configured to use the determined number of data flows associated with each access subset that are associated with all the preliminary user identifiers as a basis for determining the information loss rate corresponding to the access set.

Determining sub-unit 5033, which is configured to determine the information loss rate of an access set, according to the formula $$1 - \frac{R}{W},$$

where R represents the sum associated with each access subset's data flows that are associated with all the preliminary user identifiers that are associated with the access set; W represents the specified data flow range.

In some embodiments, counting sub-unit 5032 includes:

Counting module 50321, which is configured to determine, using the specified data flow range, the number of data flows associated with each access subset, the number of preliminary user identifiers corresponding to each access subset, and the number of access subsets corresponding to each preliminary user identifier associated with the access set.

First determining module 50322, which is configured to determine, for each preliminary user identifier associated with the access set, the number of data flows of the access subset that is associated with the preliminary user identifier.

Second determining module 50323, which is configured to determine the sum of an access subset's data flows that are associated with each preliminary user identifier to determine the access subset's data flows that are associated with all the preliminary user identifiers.

First determining module 50322, which is configured to determine an access subset's data flow associated with a preliminary user identifier according to the formula as follows:

$$\frac{N}{i \times j},$$

where N is the number data flows associated with that particular access subset, i is the total number of preliminary user identifiers corresponding to that access subset, j is the number of access subsets corresponding to that particular preliminary user identifier.

Data exchange unit 504, which is configured to determine that the information loss rate corresponding to the access set with the lowest information loss rate exceeds a preset threshold value.

Data exchange unit 504, which is configured to determine that each of the different access subsets determined from the access set with the lowest information loss rate comprises a uniform user identifier for unique visiting users.

A person skilled in the art should understand that the embodiments of the present application can be provided as methods, systems or computer software products. Therefore, the present application can take the form of embodiments consisting entirely of hardware, embodiments consisting entirely of software, and embodiments which combine software and hardware. In addition, the present application can take the form of computer program products implemented on one or more computer-operable storage media (including but not limited to magnetic disk storage devices, CD-ROMs, and optical storage devices) containing computer operable program codes.

The present application is described with reference to flow charts and/or block diagrams based on methods, equipment (systems) and computer program products. It should be understood that each process and/or block in the flow charts and/or block diagrams, and combinations of processes and/or blocks in the flow charts and/or block diagrams, can be achieved through computer program commands. One can provide these computer commands to a general-purpose computer, a specialized computer, an embedded processor or the processor of other programmable data processing equipment so as to give rise to a machine, with the result that the commands executed through the computer or processor of other programmable data equipment give rise to a device that is used to realize the functions designated by one or more processes in a flow chart and/or one or more blocks in a block diagram.

These computer program commands can also be stored on specially-operating computer-readable storage devices that can guide computers or other programmable data processing equipment, with the result that the commands stored on these computer-readable devices give rise to products that include command devices. These command devices realize the functions designated in one or more processes in a flow chart and/or one or more blocks in a block diagram.

These computer program commands can also be loaded onto a computer or other programmable data processing equipment, with the result that a series of operating steps are executed on a computer or other programmable equipment so as to give rise to computer processing. In this way, the commands executed on a computer or other programmable equipment provide steps for realizing the functions designated by one or more processes in a flow chart and/or one or more blocks in a block diagram.

Although preferred embodiments of the present application have already been described, a person skilled in the art can make other modifications or revisions to these embodiments once he grasps the basic creative concept. Therefore, the attached claims are to be interpreted as including the preferred embodiments as well as all modifications and revisions falling within the scope of the present application.

Obviously, a person skilled in the art can modify and vary the present application without departing from the spirit and scope of the present invention. Thus, if these modifications to and variations of the present application lie within the scope of its claims and equivalent technologies, then the present application intends to cover these modifications and variations as well.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
    one or more processors configured to:
        generate a plurality of access sets based at least in part on a network address identifier associated with a plurality of access requests submitted by one or more visiting users, and a plurality of header field elements associated with the plurality of access requests, wherein each of the plurality of access requests includes a preliminary user identifier, the network address identifier, and the plurality of header field elements, and wherein an access set includes the network address identifier and at least some of the plurality of header field elements;
        determine information loss rates corresponding to respective ones of at least a subset of the plurality of access sets based at least in part on the access requests, wherein to determine information loss rates corresponding to respective ones of at least the subset of the plurality of access sets based at least in part on the access requests includes to determine an information loss rate corresponding to a first access set of the plurality of access sets, wherein the information loss rate comprises a predicted accuracy of using an access set to determine uniform user identifiers for the plurality of visiting users, wherein to determine the information loss rate corresponding to the first access set includes to:
            determine a plurality of access subsets from the first access set, wherein an access subset includes a network address identifier associated with the first access set and a value corresponding to a header field element associated with the first access set;
            for each of the plurality of access subsets, determine a number of data flows associated with a plurality of preliminary user identifiers associated with the first access set; and
            determine the information loss rate for the first access set based at least in part on respective numbers of data flows associated with the plurality of preliminary user identifiers; and
        select an access set from the plurality of access sets based at least in part on the respective information loss rate to use to determine a uniform user identifier corresponding to a visiting user of the plurality of visiting users; and
    one or more memories coupled to the one or more processors and configured to provide the one or more processors with instructions.

2. The system of claim 1, wherein the plurality of header field elements includes one or more of the following: Accept-Language information, Accept-Encoding information, and User-Agent information.

3. The system of claim 1, wherein for each of the plurality of access subsets, to determine the number of data flows associated with the plurality of preliminary user identifiers associated with the first access set includes to sum together the respective number of the access subset's data flows associated with each of the plurality of preliminary user identifiers.

4. The system of claim 3, wherein to determine the information loss rate for the first access set is based at least in part on 1−R/W, where R represents a sum associated with a number of data flows associated with the plurality of preliminary user identifiers corresponding to each of the plurality of access subsets and W represents a specified data flow range.

5. The system of claim 4, wherein the specified data flow range is associated with a number of data flows associated with the first access set received over a specified time interval that are examined to determine the information loss rate associated with the first access set.

6. The system of claim 1, wherein the one or more processors are further configured to:
    determine a corresponding plurality of access subsets associated with the selected access set; and
    determine that each of the corresponding plurality of access subsets comprises a uniform user identifier.

7. A method, comprising:
    generating a plurality of access sets based at least in part on a network address identifier associated with a plurality of access requests submitted by one or more visiting users, and a plurality of header field elements associated with the plurality of access requests, wherein each of the plurality of access requests includes a preliminary user identifier, the network address identifier, and the plurality of header field elements, and wherein an access set includes the network address identifier and at least some of the plurality of header field elements;
    determining information loss rates corresponding to respective ones of at least a subset of the plurality of access sets based at least in part on the access requests, wherein determining information loss rates corresponding to respective ones of at least the subset of the plurality of access sets based at least in part on the access requests includes determining an information loss rate corresponding to a first access set of the plurality of access sets, wherein the information loss rate comprises a predicted accuracy of using an access set to determine uniform user identifiers for the plurality of visiting users, wherein determining the information loss rate corresponding to the first access set includes:
        determining a plurality of access subsets from the first access set, wherein an access subset includes a network address identifier associated with the first access set and a value corresponding to a header field element associated with the first access set;
        for each of the plurality of access subsets, determining a number of data flows associated with a plurality of preliminary user identifiers associated with the first access set; and
        determining the information loss rate for the first access set based at least in part on respective numbers of data flows associated with the plurality of preliminary user identifiers; and selecting an access set from the plurality of access sets based at least in part on the respective information loss rate to use to determine a uniform user identifier corresponding to a visiting user of the plurality of visiting users.

8. The method of claim 7, wherein the plurality of header field elements includes one or more of the following: Accept-Language information, Accept-Encoding information, and User-Agent information.

9. The method of claim 7, wherein for each of the plurality of access subsets, determining the number of data flows associated with the plurality of preliminary user identifiers associated with the first access set includes summing together the respective number of the access subset's data flows associated with each of the plurality of preliminary user identifiers.

10. The method of claim 9, wherein determining the information loss rate for the first access set is based at least in part on 1−R/W, where R represents a sum associated with a number of data flows associated with the plurality of preliminary user identifiers corresponding to each of the plurality of access subsets and W represents a specified data flow range.

11. The method of claim 10, wherein the specified data flow range is associated with a number of data flows associated with the first access set received over a specified time interval that are examined to determine the information loss rate associated with the first access set.

12. The method of claim 7, further comprising:
determining a corresponding plurality of access subsets associated with the selected access set; and
determining that each of the corresponding plurality of access subsets comprises a uniform user identifier.

13. A computer program product, the computer program product being embodied in a non-transitory computer readable storage medium and comprising computer instructions for:
generating a plurality of access sets based at least in part on a network address identifier associated with a plurality of access requests submitted by one or more visiting users, and a plurality of header field elements associated with the plurality of access requests, wherein each of the plurality of access requests includes a preliminary user identifier, the network address identifier, and the plurality of header field elements, and wherein an access set includes the network address identifier and at least some of the plurality of header field elements;
determining information loss rates corresponding to respective ones of at least a subset of the plurality of access sets based at least in part on the access requests, wherein determining information loss rates corresponding to respective ones of at least the subset of the plurality of access sets based at least in part on the access requests includes determining an information loss rate corresponding to a first access set of the plurality of access sets, wherein the information loss rate comprises a predicted accuracy of using an access set to determine uniform user identifiers for the plurality of visiting users, wherein determining the information loss rate corresponding to the first access set includes:
determining a plurality of access subsets from the first access set, wherein an access subset includes a network address identifier associated with the first access set and a value corresponding to a header field element associated with the first access set;
for each of the plurality of access subsets, determining a number of data flows associated with a plurality of preliminary user identifiers associated with the first access set; and
determining the information loss rate for the first access set based at least in part on respective numbers of data flows associated with the plurality of preliminary user identifiers; and
selecting an access set from the plurality of access sets based at least in part on the respective information loss rate to use to determine a uniform user identifier corresponding to a visiting user of the plurality of visiting users.

14. The computer program product of claim 13, wherein the plurality of header field elements includes one or more of the following: Accept-Language information, Accept-Encoding information, and User-Agent information.

15. The computer program product of claim 13, wherein for each of the plurality of access subsets, determining the number of data flows associated with the plurality of preliminary user identifiers associated with the first access set includes summing together the respective number of the access subset's data flows associated with each of the plurality of preliminary user identifiers.

16. The computer program product of claim 15, wherein determining the information loss rate for the first access set is based at least in part on 1−R/W, where R represents a sum associated with a number of data flows associated with the plurality of preliminary user identifiers corresponding to each of the plurality of access subsets and W represents a specified data flow range.

17. The computer program product of claim 16, wherein the specified data flow range is associated with a number of data flows associated with the first access set received over a specified time interval that are examined to determine the information loss rate associated with the first access set.

18. The computer program product of claim 13, further comprising:
determining a corresponding plurality of access subsets associated with the selected access set; and
determining that each of the corresponding plurality of access subsets comprises a uniform user identifier.

* * * * *